Aug. 28, 1923.

J. LAMASSIAUDE ET AL 1,466,305

BRICK PRESS

Filed March 1, 1920

2 Sheets-Sheet 1

Inventors -
Jean Lamassiaude,
Fernand Rouchaud
& Charles Rouchaud,
By B. Singer, Atty.

Aug. 28, 1923.　　　　　　　　　　　　　　　　　1,466,305
J. LAMASSIAUDE ET AL
BRICK PRESS
Filed March 1, 1920　　　2 Sheets-Sheet 2
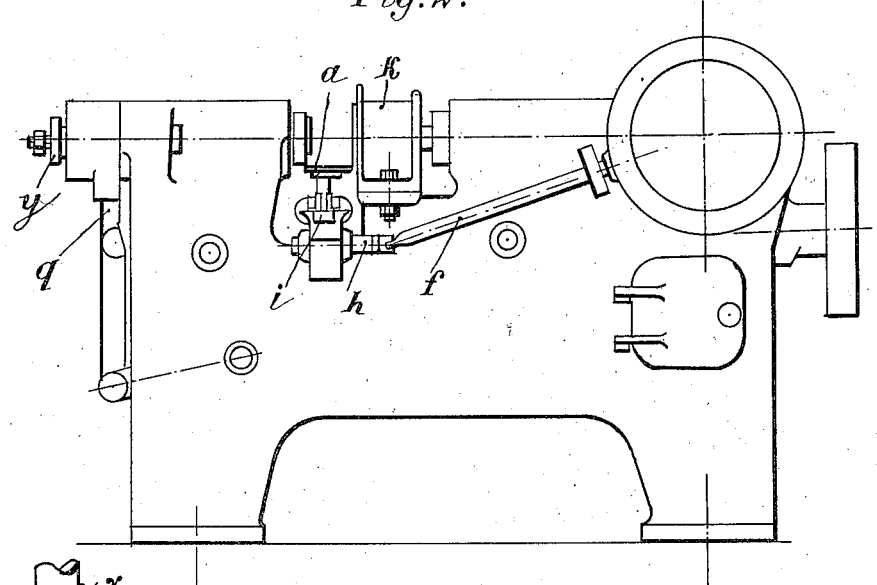
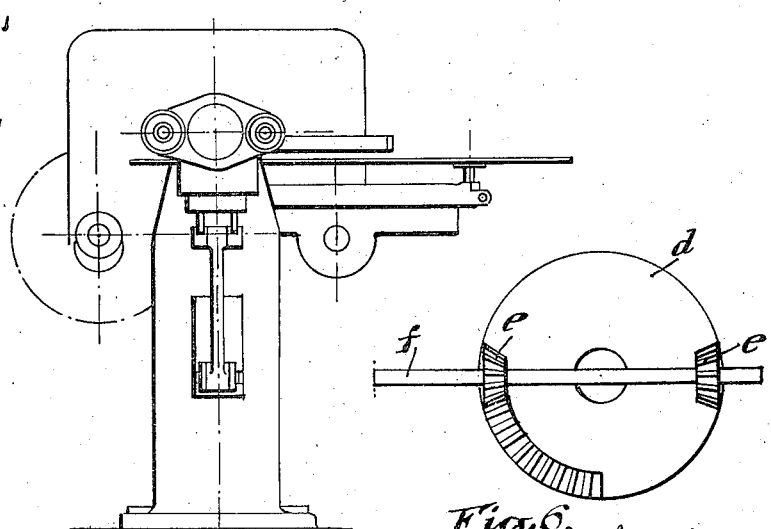

Patented Aug. 28, 1923.

1,466,305

UNITED STATES PATENT OFFICE.

JEAN LAMASSIAUDE, FERNAND ROUCHAUD, AND CHARLES ROUCHAUD, OF LIMOGES, FRANCE.

BRICK PRESS.

Application filed March 1, 1920. Serial No. 362,509.

*To all whom it may concern:*

Be it known that we, JEAN LAMASSIAUDE, FERNAND ROUCHAUD, and CHARLES ROUCHAUD, residing at Limoges, France, have invented new and useful Improvements in Brick Presses, of which the following is a specification.

This invention relates to a power press with automatic feed, and means for ejecting the bricks from the mold and for the discharge of the bricks.

The whole manipulation of the products whether they are being introduced into, or removed from, the mould, takes place out of reach of the moving compression pistons, which precludes any possibility of accidents during the working.

The brick which is thus introduced into the mold is a cast having a form which closely resembles that of the product after compression, and this cast being necessarily constituted of plastic material, semi-hard or solid, of ordinary refractory earth clay, having been passed through a draw plate or other suitable apparatus.

The main shaft driving the various parts, is driven by a motor either directly or through a reducing gear such as a worm gear, gear wheels, etc. This main shaft carries an eccentric with a small travel, driving the compression rod which intervenes only in order to compress the brick introduced into the mould by auxiliary parts.

The machine acts only on a small linear travel corresponding however to a great angle of rotation, owing to the small eccentricity of the crank pin. This arrangement which is rendered possible by the inclusion of auxiliary parts for the introduction of the brick into the mould, enables the stress to be distributed over a maximum of time, so that the power required to obtain the necessary pressure, is considerably reduced.

Figure 1:
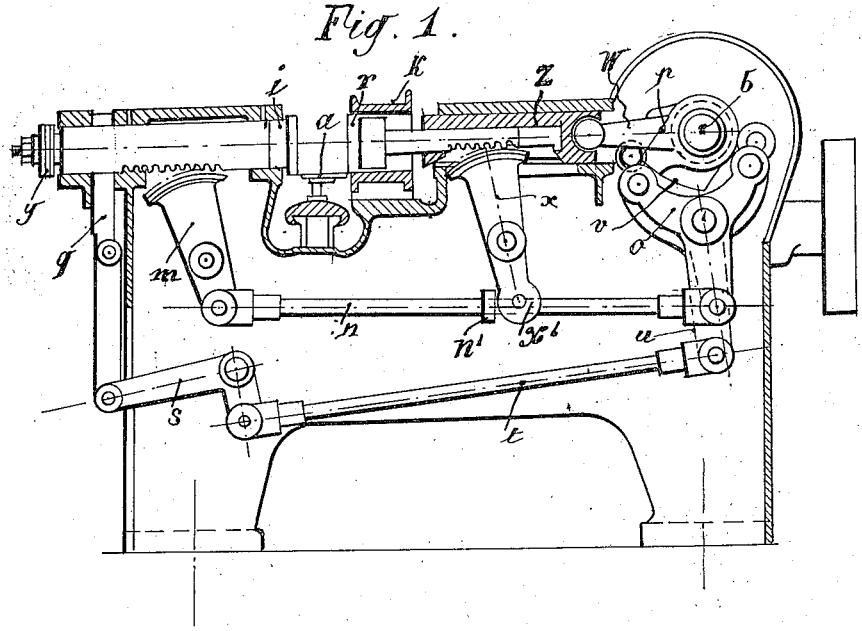
Figure 4:
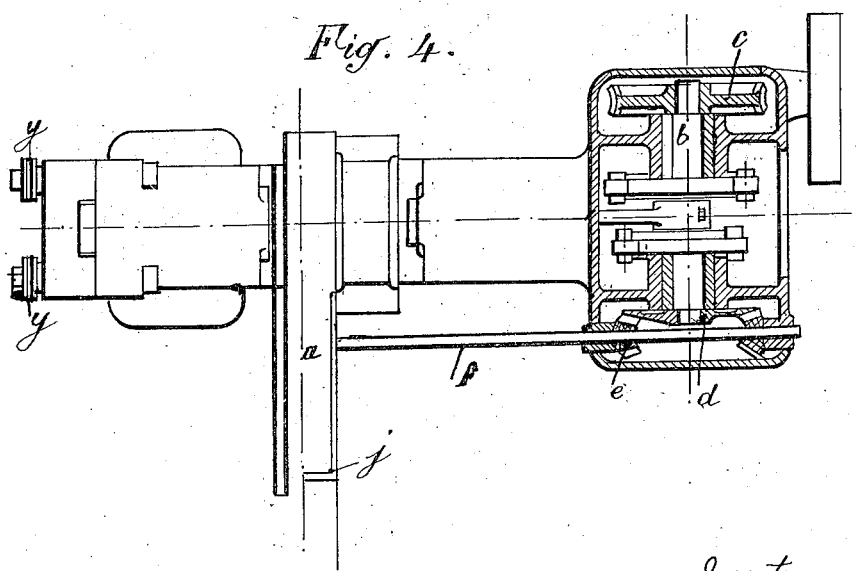

In the accompanying drawing, by way of example, Figure 1 is a vertical longitudinal section of the machine, Figure 2 an elevation, Figure 3 a lateral view, whilst Figure 4 is a plan, partly in section. Fig. 5 is a detail view. Fig. 6 is an end view of the driving means for the table including a bevel gear meshing with pinions, said gear having teeth only on a portion of its circumference.

The feed movement of the brick in front of the mould is obtained by a table $a$ having an intermittent reciprocating motion. This movement of the table is transmitted to it through suitable parts from the main shaft of the machine, and its complete cycle corresponds to one revolution of the said shaft.

The driving of the table $a$ is effected through a wheel $c$ keyed to the shaft $b$ which it drives, and the latter carries at one of its ends a conical toothed quadrant $d$ which is adapted to engage alternately with two bevel pinions $e$ diametrically opposed and symmetrical relatively to the shaft $b$, so as to impart to the shaft $f$ carrying the said pinions, a rotation of 360 degrees in each direction.

The shaft $f$ drives by means of a universal joint a shaft $h$ which carries a pinion $i$ engaging with a toothed rack secured under the table $a$, so that the said table can be given the desired reciprocating motion which at the end of each stroke is followed by a pause corresponding to the introduction of a new brick into the mould and to the taking out of the mould of the finished brick. A detent, such as is well known in the art, locks the shaft $f$ in each position of rest, in order to ensure a perfect engagement of the pinions $e$ with the toothed quadrant $d$ at each departure of the table $a$.

The brick is placed on the table $a$ before or during the return movement of the latter and is driven by adhesion until it reaches an adjustable stop $j$ which limits its movement to a fixed point of departure determined for each dimension of the brick. The latter is brought in front of the mould $k$ by the table $a$ which stops during the introduction of the brick into the mould. This movement is brought about by a plunger $i$ provided with teeth in engagement with a toothed quadrant $m$ which is driven by a connecting rod $n$ pivoted to one of the ends of a two-armed lever $o$; these two arms each terminate in a roller, and a cam $p$ acts alternately on each of the said rollers in order to transmit to the toothed quadrant $m$ its necessary rocking movement.

The brick having been pushed into the mould, an adjustable shutter $q$ is brought behind the rod of the plunger $i$ in order to maintain the latter stationary during the compression produced by the second piston Z which receives the impact of the connecting rod W, with which it is connected.

This shutter $q$ is connected to a bell crank lever $s$ which in its turn is connected by a rod $t$ to a bifurcated lever $u$, the two branches of which, terminating in rollers like the lever $o$, are alternately operated by a cam $v$ which alternately raises and lowers the shutter $q$.

The removal from the mould is then effected by the thrust of the plunger $r$ which is driven by a gear comprising a cam $p$, the lever $o$ and the connecting rod $n$ acting on a toothed quadrant $x$ meshing with a toothed rack on the under side of the stem of the plunger $r$. It will be understood that the mechanical means causes the plungers $i$ and $r$ to traverse a path sufficiently long but without having any important power to furnish, that which justifies their actuation by cams and levers, so that plunger $z$ is controlled by a crank or eccentric on the shaft $b$ and furnishes the compression with a very small displacement or extent of movement of said plunger. The member $n$ has a flange $n'$ fixed thereto, and the segment $x$ has a downwardly projecting arm which is provided at its lower end with a fork, the fingers $x'$ of which are arranged astride of the member $n$ and behind the flange $n'$. Hence the plunger $z$ is permitted to operate the plunger $r$, to compress the brick, the compressing movements of said plungers being slight, without affecting the plunger $i$ which will be held during such compression by the shutter $q$.

The supplementary pressure due to the excess of thickness of the brick, is absorbed by the resiliency of Belleville washers $y$ or by some other spring mechanism. The thickness of the bricks can be regulated during the working by means of horseshoe shaped washers inserted between the compressor plunger $z$ and the ejecting plunger $r$. The compressing plunger has a bore in which the stem of the ejecting plunger operates, as shown in Figure 1. Interchangeable moulds make it possible to obtain bricks of variable dimensions; it is only necessary to vary the height of the table by sliding it on its supports.

The brick is carried away by the table $a$ after it has been removed from the mould. An additional driving device is provided in case the brick sticks to the ejecting plunger on account of the state of the clay or of the lubricant used. This driving device is constituted by a pivoted auxiliary table which is raised after the brick has been ejected from the mold; it pushes the brick parallel to the face adhering to the ejecting plunger, detaches it and carries it away. The abutment $i$ is in effect stationary and independent of the table. The workman places in the interior of its rack and against the same a cast to be molded, as indicated in Fig. 4. Assuming that the table has not terminated its movement of separation from the mold, the cast moved by the table remains stationary by virtue of the racks of an abutment. After the table returns toward the mold, the cast is still in the same position and toward the end of the table movement arrives in a position before the mold whereupon the workman is enabled to place during this time a new cast against the rack of the abutment $j$.

The chief characteristic features of the invention are as follows:—

1. The machine is power driven, with automatic feeding motions for unmoulding and discharging the brick.

2. Any manipulation of the products takes place out of reach of the moving parts.

3. A small power is required for ensuring the desired pressure, the stroke of the compressing piston being very short and the work being distributed over a great angle of rotation. All the auxiliary movements of great amplitude are brought about by parts driven independently of the compressing piston.

4. The thickness of the brick can be regulated during the operation of the press.

5. The pistons are arranged horizontally, which is a very convenient method.

6. The reciprocating motion of the table takes place with a pause at the end of each stroke, obtained by means of a bevel quadrant provided with teeth only on a portion of the circumference and engaging alternately with two bevel pinions.

With the said machine could be combined: a device by means of which continuous working or working with an automatic stop after each moulding can be obtained at will. A device for stopping the machine when the product exceeds the limit dimensions which the manufacturer prescribes. A draw plate with a movement synchronized with that of the brick press, and a conveyor automatically transporting the compressed product into the drying kiln.

This arrangement has the advantage of doing away with hand labour to a great extent.

Having now particularly described and ascertained the nature of our said invention and in what manner the same is to be performed, we declare that what we claim is:—

1. In a machine for compressing bricks, a cast carrying member mounted for reciprocating movement, a mold arranged at one side of the path of said member, an ejecting plunger mounted for movement in said mold, a compressing plunger also arranged for movement in the mold, behind and independently of the ejecting plunger, a third plunger movable across the path of said member to and from the mold, to move a cast from said member to said mold, means to lock said third member at the end of its cast-moving movement, and means to operate said plungers and said locking means.

2. In a machine for compressing bricks, a mold, an ejecting plunger mounted for movement in said mold, and a compressing plunger also arranged for movement in the mold behind and independently of the ejecting plunger and to impart compressing movement to the latter, and means to actuate said plungers in the order named.

3. In a machine for compressing bricks, a mold open on opposite sides, an ejecting plunger mounted for movement in said mold from one side thereof, a compressing plunger also arranged for movement in the mold behind and independently of the ejecting plunger and to impart compressing movement to the latter, a third piston movable toward and from the opposite side of the mold, means to operate said plungers, means to lock the third piston in closed position against the mold, and means to operate said locking means.

4. In a machine for compressing bricks, a mold, an ejecting plunger mounted for movement in said mold, a compressing plunger also arranged for movement in the mold, behind the ejecting plunger, said ejecting plunger having a stem and said compressing plunger having a bore in which said stem operates, means to impart ejecting stroke to the ejecting plunger and permit return movement thereof, and means to operate the compressing plunger and cause the same to move the ejecting plunger therewith and ahead thereof, to impart compressing movement thereto.

5. In a machine for compressing bricks, a mold, an ejecting plunger mounted for movement in said mold, and having a stem provided with rack teeth, a compressing plunger also arranged for movement in the mold, behind the ejecting plunger, means to positively move the compressing plunger in both directions, and means to impart ejecting movement to the ejecting plunger, independently of the compressing plunger, and to enable said ejecting plunger to be moved with and by the compressing plunger during compressing movement of the latter.

In witness whereof we affix our signatures.

JEAN LAMASSIAUDE.
FERNAND ROUCHAUD.
CHARLES ROUCHAUD.